Figure 1:
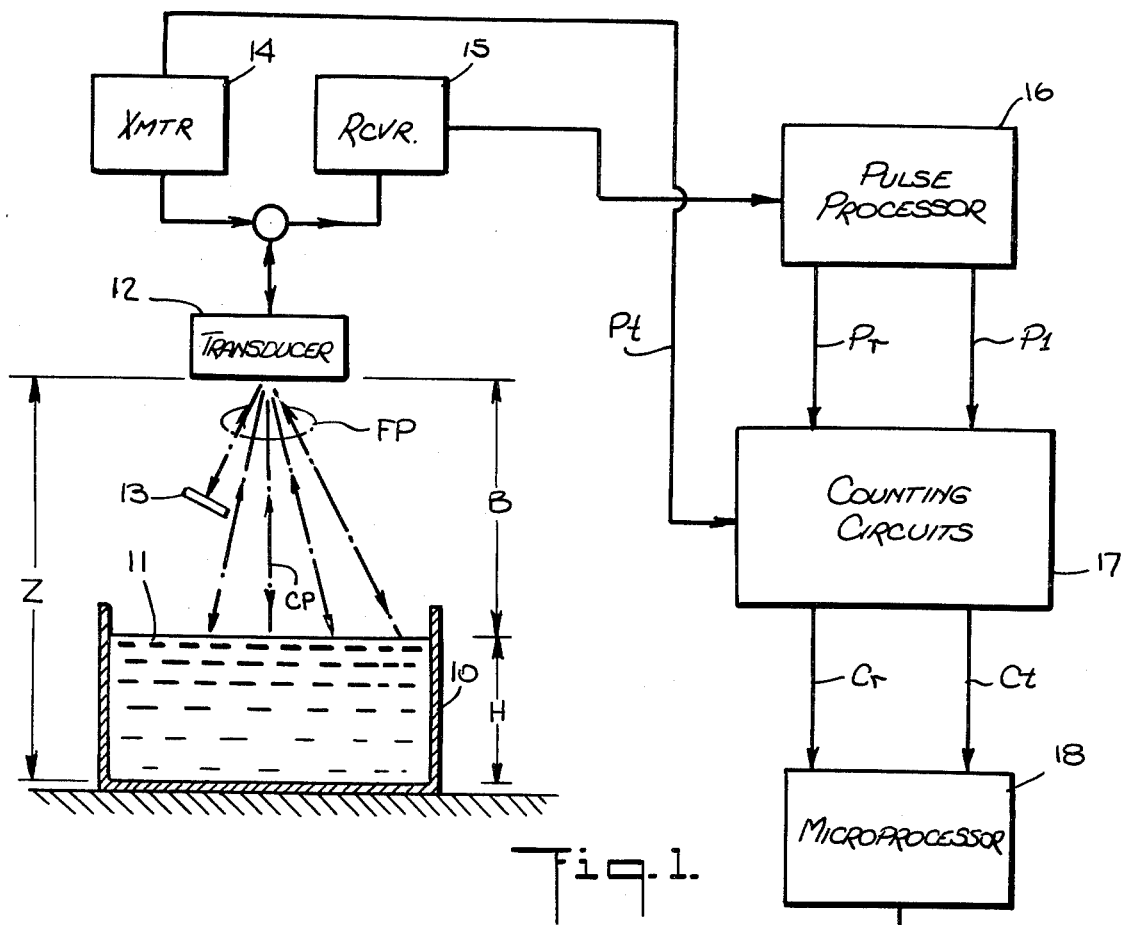

United States Patent [19]

Soltz

[11] Patent Number: 4,470,299

[45] Date of Patent: Sep. 11, 1984

[54] ULTRASONIC LIQUID LEVEL METER

[75] Inventor: Daniel J. Soltz, Norristown, Pa.

[73] Assignee: Fischer & Porter Company, Warminster, Pa.

[21] Appl. No.: 337,082

[22] Filed: Jan. 4, 1982

[51] Int. Cl.$^3$ .................. G01F 23/28; G01S 15/08
[52] U.S. Cl. .................. 73/290 V; 367/108; 367/908
[58] Field of Search .................. 73/290 V, 597, 609, 73/215; 367/908, 108

[56] References Cited

U.S. PATENT DOCUMENTS

| | | | |
|---|---|---|---|
| 3,834,233 | 9/1974 | Willis et al. | 73/290 V |
| 3,996,798 | 12/1976 | Vander Heyden | 73/215 X |
| 4,130,018 | 12/1978 | Adams et al. | 73/290 V |
| 4,146,869 | 3/1979 | Synder | 73/290 V X |
| 4,159,646 | 7/1979 | Paulsen et al. | 73/290 V X |
| 4,170,144 | 10/1979 | Scott | 73/609 |
| 4,210,967 | 7/1980 | Massa | 73/290 V X |

FOREIGN PATENT DOCUMENTS

| | | | |
|---|---|---|---|
| 1329765 | 12/1961 | France | 367/908 |
| 0765659 | 9/1978 | U.S.S.R. | 73/290 V |

Primary Examiner—Daniel M. Yasich
Attorney, Agent, or Firm—Michael Ebert

[57] ABSTRACT

An ultrasonic echo-ranging system adopted to measure the level of liquid in an open channel or other liquid container. The system includes an ultrasonic transducer disposed at a fixed position directly above the liquid surface, the nature of the gaseous environment therebetween determining the velocity of ultrasonic energy propagated therethrough. The transducer is excited to emit periodic pulses which are directed along a center path toward the liquid surface and reflected to produce liquid echo pulses which return to the transducer and are detected thereby. A reference reflector at a predetermined position relative to the transducer intercepts energy from a side path in the radiation pattern of the transducer to return it to the transducer to produce reference echo pulses. Means are provided to determine the transit time of pulses along the center path, and also to determine the transit time along the side path. The ratio of the reference side path and center path transit times is computed to provide an output representing the level of liquid independent of changes in the gaseous environment.

5 Claims, 3 Drawing Figures

ULTRASONIC LIQUID LEVEL METER

BACKGROUND OF INVENTION

This invention relates generally to ultrasonic liquid level meters of the echo-ranging type, and more particularly to a meter that is compensated for environmental changes in the gaseous medium through which the ultrasonic energy is propogated.

In an ultrasonic liquid level meter of the echo-ranging type, pulse of ultrasonic energy transmitted from a station placed above the liquid and reflected thereby to produce echo pulses which are received at the station. By determining the round trip transmit time of the pulse energy in the gaseous medium above the liquid suface, which transit time depends on the distance between the station and the surface, one is able to provide a reading of liquid level.

The accuracy of an ultrasonic liquid level meter of the echo-ranging type is adversely affected by environmental changes, notably temperature, pressure and chemical composition. These factors alter the velocity of acoustic propogation. For example, the velocity sound in air at 0° C. is 1,087.42 fps, whereas in carbon dioxide it is 1,106 fps. When a meter is installed in an environment in which the chemical nature of the gaseous medium undergoes change, this factor will disturb the level reading unless means are provided to compensate or correct therefor. Similarly, changes in the temperature of the medium or in ambient pressure adversely affects the accuracy of the instrument.

In order to provide a reading in an echo-ranging liquid level meter, which is independent of changes in the propogation medium (air or other gas), the U.S. Pat. No. 3,834,233 to Willis et al discloses a first transducer mounted on top of a tank to direct sound energy down into the tank and to detect an echo from the surface of the liquid therein. To compensate for inaccuracies due to changes in the velocity of the sound, Willis et al positions a second transducer a fixed distance from the first to detect the transmitted wave. Detected signals derived from the two transducers are processed to cancel the effects of any variation in the velocity of sound due to environmental fluctuations.

And in order to obviate the need for a second transducer, the U.S. Pat. No. 4,130,018 to Adams et al places a reflector at the center of the level-detecting ultrasound beam. This reflector is a fixed distance from the transmitting transducer, so that an echo is received from this reflector as well as from the surface of the liquid. To this end, Willis et al mounts his transducer within an elongated tube having at its outlet a reference reflector assembly to reflect back a portion of the radiated energy.

The chief disadvantages of the Adams et al instrument, apart from the additional cost of the tube extension for the transducer, is that the center of the ultrasonic beam is obstructed by the reference reflector. This gives rise to attenuation path distortion of the transmitted ultrasonic energy as well as the received echo energy.

SUMMARY OF INVENTION

In view of the foregoing, the main object of the invention is to provide an ultrasonic liquid level meter of the echo-ranging type which includes reference means to compensate for environmental changes, thereby to produce an accurate reading of liquid level.

A significant feature of the invention is that the reference reflector means do not obstruct or distort the ultrasonic energy in the liquid level measuring path, thereby overcoming the drawbacks incident to prior art reference reflectors.

More particularly, an object of this invention is to provide a meter of the above-type in which compensation is effected by a reflector fixedly positioned to intercept and reflect energy from a side portion of the radiation field pattern of the transmitted beam to produce a reference signal which in no way interferes with the main liquid level signal derived from transmitted energy in a path normal to the surface of the liquid.

Also, an object of the invention is to provide a compensated ultrasonic liquid level meter which is of relatively simple and inexpensive design and which affords highly accurate liquid level readings regarding changes in environmental conditions.

Briefly stated these objects are obtained in an ultrasonic echo-ranging system adopted to measure the level of liquid in an open channel or other liquid container. The system includes an ultrasonic transducer disposed at a fixed position directly above the liquid surface, the nature of the gaseous environment therebetween determining the velocity of ultrasonic energy propogated therethrough. The transducer is excited to emit periodic pulses which are directed along a center path toward the liquid surface and reflected to produce liquid echo pulses which return to the transducer and are detected thereby. A reference reflector at a predetermined position relative to the transducer intercepts energy from a side path in the radiation pattern of the transducer to return it to the transducer to produce reference echo pulses. Means are provided to determine the transit time along the side path. The ratio of the reference side path and center path transit times is computed to provide an output representing the level of liquid independent of changes in the gaseous environment.

OUTLINE OF DRAWINGS

For a better understanding of the invention as well as other objects and further features thereof, reference is made to the following detailed description to be read in conjunction with the accompanying drawings wherein:

FIG. 1 schematically illustrates one preferred embodiment of a liquid level meter in accordance with the invention.

Figure 2:
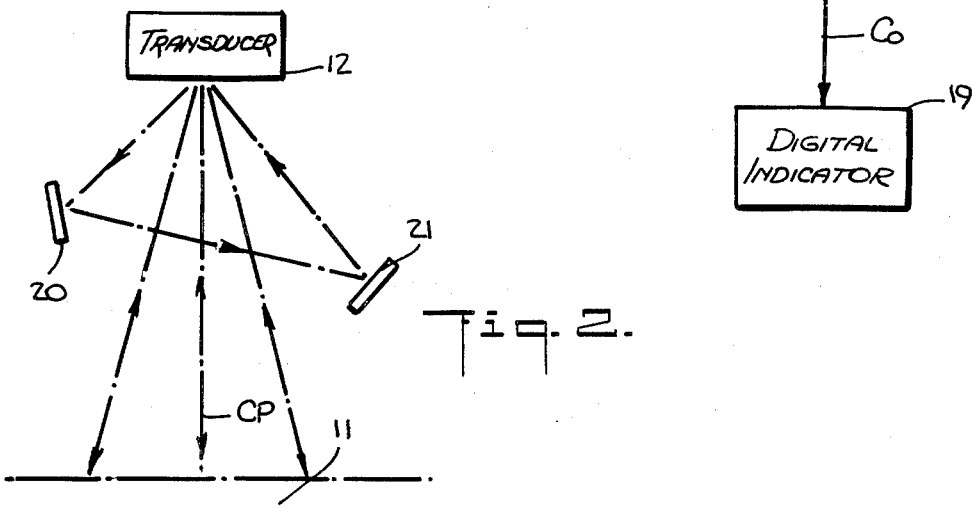
Figure 3:
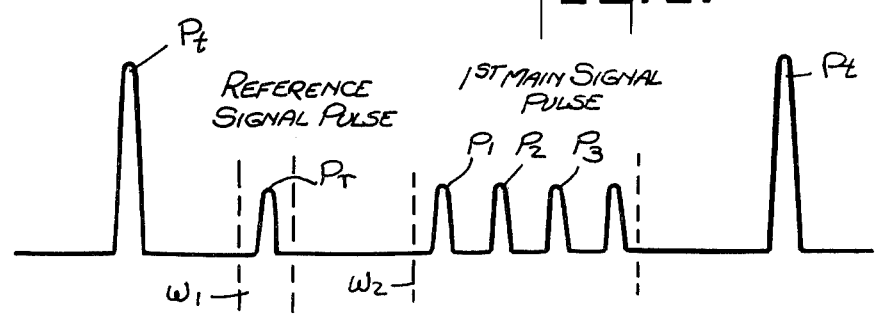

FIG. 2 schematically illustrates a second embodiment thereof;

FIG. 3 is a pulsewave diagram showing the time relationship of the reference and main echo signal pulses to the transmitted pulse.

DESCRIPTION OF INVENTION

Referring now to FIG. 1, for purposes of illustration, there is shown an open trough or channel 10 through which liquid 11 flows, the instrument in accordance with the invention serving to measure the level H of liquid in the channel. By placing a dam in the channel, the level of liquid attained downstream of the dam will depend on flow rate; hence by measuring this level one can also determine flow rate.

In practice, instead of an open channel, the liquid, whose level is to be measured, may be that held in a process tank or in any other container. Consequently the atmosphere above the surface of the liquid is not necessarily pure air and may include ammonia, carbon dioxide or other gases.

Mounted above channel 10 at a station having a fixed vertical distance Z from the bottom of the channel is an ultrasonic transducer 12. This may take the form of a piezoelectric ceramic, an electrostatic unit or any other element capable of generating ultrasonic energy of adequate strength. The straight line distance B between the face of transducer 12 and the surface of the liquid depends on the varying level H of the liquid. Thus the value of Z is constant, whereas the relative values of H and B vary, but always add up to Z.

The field radiation pattern produced by an ultrasonic transducer is related to the ratio of the transducer's ultrasonic wavelength to its diameter. Thus a large diameter-to-wavelength ratio produces a relatively narrow field pattern and a small ratio, a broad field pattern. For echo-ranging applications, a narrow profile is preferred; however, in FIG. 1 a relatively broad field pattern FP is illustrated to make the nature of the invention more readily evident.

Field pattern FP includes a center beam path CP which extends vertically from the transducer face to the surface of the liquid and is normal thereto. Path CP represents the shortest distance between the transducer and the liquid surface, for all other paths in the radiation field pattern more or less diverge from normal and represent progressively longer distances.

Placed at a fixed distance from transducer 12 at a position to intercept a side path of energy in the radiation pattern is a reflector 13. The reflector produces an echo pulse that is returned to the transducer, its time of transit being a function of the distance of the reflector from the transducer and of the velocity of sound in the gaseous medium.

Transducer 12 is excited periodically by a transmitter 14, causing the transducer to emit periodic pulses of ultrasonic energy in a field pattern as shown in FIG. 1.

The transmitted energy is propogated through the gaseous medium between the transducer and the liquid surface and it is directed toward the surface where it is reflected and returned to the transducer which now acts as a detector whose output is coupled to a receiver 15. In practice, a transmit-receiver switch is provided to disconnect receiver 15 from the transducer when it is being excited.

As shown in FIG. 3, each transmitted pulse $P_t$ is first followed in time by a reference echo pulse $P_r$, for the reference distance from the transducer is shorter than the liquid surface. The reference echo pulse is followed by a main Pulse $P_1$, which is received over the center path CP, the shortest distance to the liquid surface. Subsequently echo pulses $P_2$, $P_3$, etc. are received from paths in the radiation pattern which more or less diverge from normal and are picked up after the main pulse $P_1$, for these pulses represent slightly longer distances to the liquid surface.

Receiver 15 operates in conjunction with a signal pulse processor 16. This processor selects from the train of echo pulses received in the interval following each transmitted pulse and from whatever noise or spurious pulses are present in this interval, only pulse $P_r$ representing the distance to the reference reflector 13, and pulse $P_1$ representing this center path distance to the liquid surface.

To this end, the processor includes a first electronic window $W_1$ or gate whose time position relative to the transmitted pulse $P_t$ is made such as to admit reference echo pulse $P_r$ and to reject all other signals. Thus one output of processor 16 is reference echo pulse $P_r$. The process further includes a second window $W_2$ or gate whose time position relative to the transmitted pulse $P_t$ is adjustable to admit the echo pulse $P_1$ from the liquid surface and to reject all other signals.

In order to extract the first echo pulse $P_1$ from the succession of pulses thereafter, use may be made of an automatic gain control amplifier system as disclosed in the copending application of Ryan Ser. No. 252,347 filed Apr. 9, 1981, now U.S. Pat. No. 4,402,231, whose entire disclosure is incorporated herein by reference. In this AGC arrangement which operates in conjunction with an ultrasonic measuring device, only the first swing or pulse in the received energy is amplified, for thereafter the amplifier input is clamped to ground to effectively exclude subsequent pulses. Thus processor 16 yields pulse $P_1$ in its second output.

In order to determine the transit time of ultrasonic pulse energy in its round trip from transducer 12 to the liquid surface along center path CP, the pulses $P_r$, and $P_1$ are applied to a counter circuit 17. This may be of the type disclosed in the Adams et al U.S. Pat. No. 4,130,018 which includes a clock generating pulses at a constant rapid rate. The clock is caused to start at a point in time coincident with the transmitted pulse $P_t$ and stopped at a point in time coincident with the reference echo pulse $P_r$. The number of clock pulses in this period is electronically counted to provide a count $C_r$ representing the reference transit time. A similar clock arrangement provides a count $C_1$ representing the transit time along the center path CP. The counts $C_r$ and $C_1$ are applied to a microprocessor 18 which in a manner to be latter explained, yields an output count $C_o$ representing the level of the liquid independent of environmental changes. Count $C_o$ is applied to a digital indicator 19 to provide the desired level reading.

In the arrangement shown in FIG. 2, the reference echo pulse is obtained by placing a deflector 20 at a fixed position in a side path in the radiation field pattern, which deflector directs the side path energy toward a reflector 21 at a fixed position displaced from the opposite side path and therefore outside of the radiation pattern, the reflector returning the deflected energy to the transducer via the same path; namely, the reflected signal is directed from reflector 21 toward deflector 20 to the transducer.

This arrangement is useful when it is desirable to extend the reference distance to produce a reference pulse adequately displaced in time from the instant of transmission.

OPERATION

If the round trip time from transducer 12 to reference 13 is represented by symbol "t", the fixed distance therebetween by "R", and the velocity of the ultrasonic energy in air by "C"; then $t = 2R/C$ (eq. 1).

And if the round trip time along the center path CP from transducer 12 to the surface of this liquid is represented by symbol "T", and "B" represents the distance therebetween; then $T = 2B/C$ (eq. 2).

By taking the ratio of equations (1) and (2) and solving for "B", this yields an equation (3) free from the environmental factor (C), the velocity of ultrasonic energy in air. Thus, $B = R(T/t)$ (eq. 3).

Liquid level (H) can now be calculated, for $H = Z - B$ (eq. 4).

Where (Z) as shown in FIG. 1, is the vertical distance between the face of transducer 12 and the bottom of channel 10, and (B) is the length of center path CP between the transducer and the surface of the liquid.

Since in the arrangement shown in FIG. 1, count $C_r$ represents the value of (t) and count $C_1$ represents the value of (T), whereas the value of (R), the fixed distance between the transducer and the reflector 13, is known, microprocessor 18 may be programmed to calculate the value of (H) to yield the output count $C_o$ representing this value.

While there has been shown and described a preferred embodiment of Ultrasonic Liquid Level Meters of the Echo-Ranging Type in accordance with the invention, it will be appreciated that many changes and modifications may be made therein without, however, departing from the essential spirit thereof.

I claim:

1. An ultrasonic echo-ranging system to measure the level of a liquid in an open channel or other liquid container located in a gaseous environment subject to changes which affect the velocity of acoustic propagation; said system comprising:
   (A) an ultrasonic transducer disposed at a fixed position directly above the liquid; the gaseous environment therebetween determining the velocity of ultrasonic energy propagated therethrough;
   (B) means to excite the transducer to emit periodic pulses of ultrasonic energy which are directed toward the surface of the liquid and reflected thereby to produce liquid echo pulses which return to the transducer and are detected thereby, said transducer having a radiation field pattern that includes a center path normal to the liquid surface and a side path which diverges from normal;
   (C) reference means at a fixed position relative to the transducer to intercept energy from said side path and to return it to the transducer to produce reference echo pulses, said reference means being constituted by a reflector placed in said side path;
   (D) receiver means coupled to the transducer to derive therefrom at separate outputs the liquid echo pulses representing center path reflection and the reference echo pulses representing side path reflection, said receiver means including means to exclude liquid echo pulses except pulses from the center path;
   (E) measuring means coupled to said separate outputs to measure the time elapsed between the emitted transducer pulse and a subsequent reference echo pulse along the side path to determine the reference transit time, and to measure the time elapsed between the emitted transducer pulse and a subsequent liquid echo pulse along the center path to determine the center path transit time; and
   (F) computer means coupled to the measuring means to calculate the ratio of the reference and center path transit times and to yield an output representing the level of the liquid independent of changes in the gaseous environment.

2. A system as set forth in claim 1, wherein said receiver means operated in conjunction with a pulse processor which provides one window to pass only said reference echo pulse and another window to pass only said liquid echo pulse.

3. A system as set forth in claim 1, wherein said reference means is constituted by a deflector placed in said side path to deflect the energy intercepted thereby toward a reflector placed outside of said pattern, said reflector returning the energy to the transducer.

4. A system as set forth in claim 1 wherein said computer means is a microprocessor.

5. A system as set forth in claim 1, wherein said means to measure the elapsed time includes a pulse generating clock which is started at a point coincident in time with the emitted pulse and which is stopped at a point coincident with an echo pulse.

* * * * *